Patented June 10, 1941

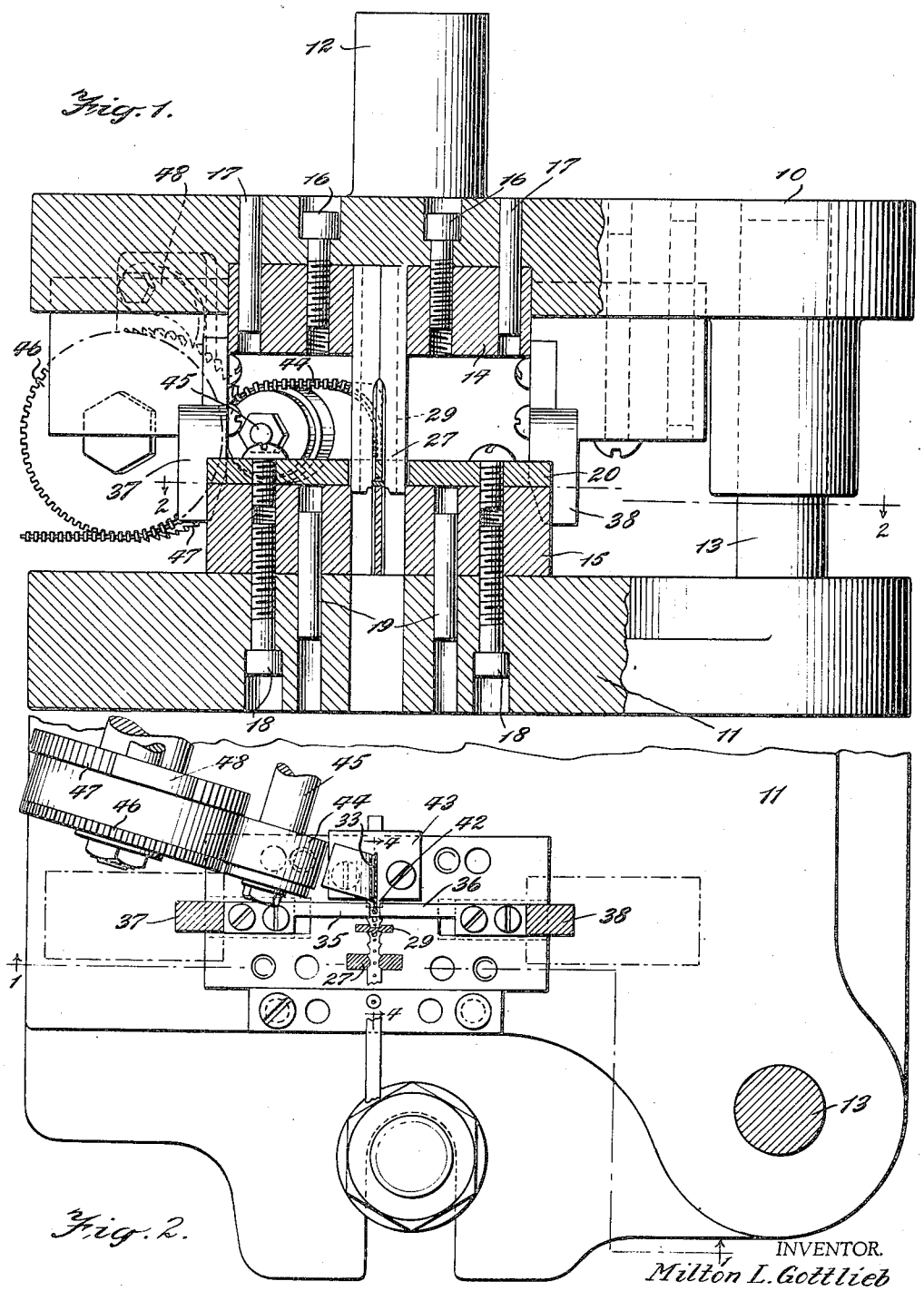

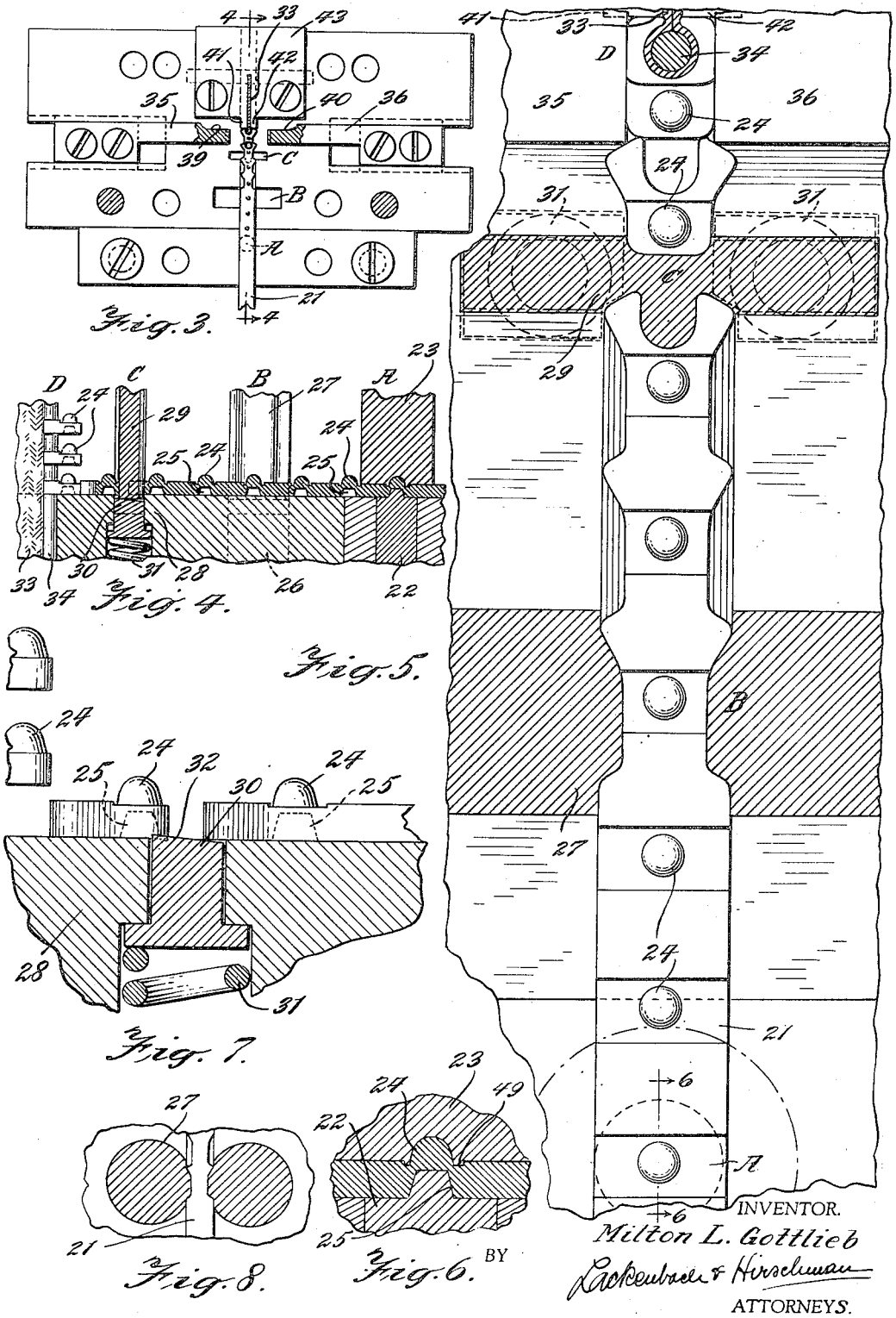

2,245,031

UNITED STATES PATENT OFFICE 2,245,031

APPARATUS FOR MAKING SEPARABLE FASTENERS

Milton L. Gottlieb, New York, N. Y.

Application May 9, 1939, Serial No. 272,550

9 Claims. (Cl. 29—34)

The invention relates to a method of producing separable fastener elements of the hookless type, and to an apparatus for carrying out such method. More particularly, the invention relates to such apparatus whereby, and by the means of which, such fastener elements may be produced in quantity in a substantially continuous series of operations from a strip of metal stock fed longitudinally into the machine and from which strip the individual fastener elements are stamped at a series of stations by punches or dies simultaneously operated on successive portions of said strip.

One of the objects of the invention is to provide such apparatus which will produce the fastener elements with accuracy, speed and relatively low loss of stock material. A further object of the invention is to make possible the use of narrow strips of the comparatively expensive stock material and yet permit the utilization of a strip of such stock which need not conform precisely to the width of the unit to be punched therefrom; i. e. make possible the use of stock of comparatively wide variation in width, so long as such strip is of a width over the minimum represented by the final width of the finished unit.

One difficulty with prior methods and apparatus for producing hookless fastener elements, in which the blanking out of the scrap from the stock material leaves the strip with the legs of the fastener unit, which is to be secured to the stringer, spread apart, as distinguished from other prior processes in which the element is formed with the legs substantially adjacent and which are then spread apart, is that the stock material which is to be operated upon had to be extremely accurate in width. As the strip of stock material, conventionally a corrosion-resistant metal such as brass, is comparatively expensive, any method or apparatus of such other prior processes, in which a large proportion of the stock had necessarily to be cut away, involved the production of the fastener elements with considerable waste of such expensive material. In contradistinction to these expensive processes, the method and apparatus of the present invention makes possible the production of fastener units with little waste and from strips of stock corresponding substantially to the width of the finished unit, but not necessarily of precise and accurate dimensions. In other words, the stock which is to be fed into my novel apparatus may be wider than the finished unit. There is, therefore, no premium to be paid by the manufacturer on the price of the metallic stock for narrow and accurate gauge of such stock.

A still further object of my invention is to provide an apparatus in which the width of the unit to be produced is accurately set by the notching punches and which operate in such manner that the apparatus constitutes a scavenger of an extremely small quantity of waste material cut out from the longitudinally fed strip of stock of a width substantially identical with the width of the finished unit to be produced.

A feature of my novel apparatus is the production thereby of the fastener units with the interlocking projections produced on the top of the unit and the recesses on the bottom thereof. In prior machines in which the projections were formed on the bottom of the strip, a groove in the die was necessary in order that the projection might not be distorted as the stock was fed forwardly. It was necessary to have the projection extend downwardly in order that the blanking could be effected against the flat, bottom surface of the unit. In my method, this is unnecessary since the projection is on top of the stock. In the present process and apparatus, the necessity of providing a groove in the die, to provide a clearance for the projection, is eliminated, since the projection is on top. The primary reason for having the projection at the top, is that the material can be supported during the shearing operation (blanking) upon the flat surface of the unit.

As the average life of a punch or set of dies conventionally used in the production of interlocking fastener units of this general type is approximately thirty hours, necessitating the replacement of such dies or punches at the end of each such period, it is one of the objects of my invention to provide punches or dies of comparatively substantial section extending rearwardly of the shearing surfaces with a support on both sides whereby inherently strong and comparatively massive bodies are provided to the punches or die elements instead of the fragile, light sectioned body of metal heretofore used in this type of apparatus.

A still further object of the invention is to provide a construction in which a spring-pressed plunger is adapted to lift the heel of the unit to clear the die surface, thereby eliminating the difficulty usually met with by reason of the slight burring that is necessarily imparted to the edge surfaces of the elements by the punching operation.

In accordance with my novel construction, also, the unit which is to be produced, or several of such units, is positioned between the parting punch, i. e. the die element which is to sever the formed unit from the strip of metal stock and the stringer feed mechanism, whereby there is imparted additional metal strength to the die.

Other objects and features of construction will be apparent to those skilled in the art from the following description of an embodiment of my novel apparatus and the mode of operation thereof involving my novel method of producing separable fastener elements.

In the drawings,

Fig. 1 is a vertical section on the line 1—1 of Fig. 2, being a vertical section showing the die elements and tape or stringer feeding mechanism;

Fig. 2 is a section along the line 2—2 of Fig. 1;

Fig. 3 is a plan view of the die elements;

Fig. 4 is a vertical section along the line 4—4 of Fig. 3;

Fig. 5 is an enlarged plan view, substantially ten times actual size, of the strip of stock material and the series of punches and clamping members operable thereon;

Fig. 6 is a section on the line 6—6 of Fig. 5;

Fig. 7 is an enlarged detail of the spring-pressed plunger effective to lift the heel of the separated fastener unit to clear the die surface; and Fig. 8 is a section through a modified form of punch suitable for use in my novel apparatus.

Referring more particularly to the drawings, in which similar reference characters identify similar parts in the several views, 10 and 11 designate, respectively, the upper and lower punch holders of a conventional die set having a reciprocating shank 12 and pillars 13 connecting the upper and lower punch holders or blocks. As the die set and its associated framework designed to cause an accurate registry of the dies and punches constitute no part of the present invention, but the representation thereof in the drawings is along standard practice, it will not be herein described in detail. It is believed sufficient to indicate generally that positioned between the upper and lower punch holders 10 and 11 are secured punch and die blocks 14 and 15, respectively, the former being secured to the punch holder by means of bolts 16, 16 and dowels 17, 17, and the lower or die blocks being secured to the die frame 11 by bolts 18, 18 and dowels 19, 19. Upon the surface of the die block 15 is positioned the stripper plate 20.

The relationship and sequential disposition of the movable dies and punches are best illustrated in Figs. 3 to 5, to which reference will now be made. It will be noted that the three sets of movable dies are positioned in alignment so as to progressively operate upon the strip of stock material being fed into the apparatus, with the three sets of dies simultaneously operable upon the strip of stock material as such strip is fed longitudinally into the apparatus. In effecting this simultaneous series of operations, the strip of stock material is operated upon at station A to form therein the interlocking projections and recesses by means of which the finished units, when secured upon a stringer tape, are adapted to be interlocked in well known fashion. At the next station B, the strip of stock material is operated upon by a pair of punches which are effective to remove waste material from the strip material along each side edge of the strip, leaving the strip at the body of the unit to be formed of substantially the width of such finished unit with the leading edge of the strip having the material from which the legs are to be formed substantially in the position and configuration thereof which they will have upon completion of the unit. At the next station C, the material between the legs of the unit is punched from the strip, severing the unit from the strip, and leaving such legs in substantially spread-apart position ready to be clamped about the corded stringer tape to which the fastener elements are to be secured. At the next station D, the legs of the fastener unit are pressed together about the corded edge of the stringer tape and thereby permanently secured to said stringer tape. It is to be noted that at station C, at which the material between the legs of the fastener unit is removed from the strip of stock material, the unit is severed from the stock, so that there is at least one substantially completed unit positioned between the parting punch and the station D, i. e. at which the unit is secured to the stringer.

Referring now particularly to the operation at station A, at such station the strip of metallic stock 21 is operated upon by die 22 and punch 23 to raise out of the strip of stock upon its upper surface the pin or projection 24, the die 22 entering into, when the material of the stock is pressed down thereupon, to produce the recess or cup 25.

At station B, the die 26 and corresponding punch 27 having their parts extend upon each side of the strip of metal stock being fed remove the waste material along each longitudinal edge of the strip of metal stock, the punches and dies being so configured as to leave the strip after this operation identical in width with the width of the finished unit throughout its body and substantially the width of the diverged legs of the unit.

At the next station C, the die 28 and punch 29 are effective to remove from the strip of metallic stock, the material between the divergent legs of the unit, at the same time severing the unit from the remainder of the stock strip. Between the die 28 and punch 29 at this station, there is provided a spring-pressed plunger 30 urged upwardly by a spring 31, the plunger having a slightly inclined upper surface 32 upon which the unit slides in its forward movement through the apparatus at this station, the spring-pressed plunger being effective to lift the heel of the unit to clear the surface of the die 28. This construction eliminates the difficulty encountered by the unavoidable burring of the heel portion of the unit during the punching operation, and is effective to provide a smooth and continuous operation of the apparatus without interruption by reason of the catching of the uneven burred surface of the heel of the unit against the surface of the die over which it travels in its forward movement.

The completed fastener unit, having now arrived at station D, its divergent legs are brought into position straddling the stringer tape 33 fed longitudinally into the apparatus by mechanism hereinafter to be described, the forward edge of the stringer tape having the conventional cord 34 enclosed by the material of the tape, the clamping members 35 and 36 being now brought into operation to move them toward each other so as to clamp the leg portions of the fastener unit together about the corded stringer tape and thus secure the unit firmly to the stringer. The movement of these clamping members 35 and 36 toward and away from each other is controlled by cams 37 and 38 shown in section in Fig. 2.

As will be noted from Fig. 3, the clamping members 35 and 36 have their leading portions slightly cut away at 39 and 40 to permit them, during their operation of compressing the leg portions of the fastener unit, to pass the tape clamping members 41 and 42 constituting projections of the block 43 through which the tape is fed to the station D.

The feeding of the brass stock through the apparatus is accomplished by means of a standard type of feed mechanism. For the feeding of the tape, as shown in Figs. 1 and 2, the tape is pulled upwardly within the split portion of the block 43, the tape with the fastener units secured to the corded edge thereof passing over roller 44 secured upon shaft 45, there being a guide (not shown) between block 43 and roller 44, and then around a toothed wheel 46, the teeth or depressions of which are designed to accommodate one of the fastener units secured to the tape, so that rotation of the wheel 46, with the individual fastener units positioned within the recesses therein, causes the feeding of the remainder of the tape through the station D. The wheel 46 is rotated by means of a ratchet wheel 47 which, in turn, is given an intermittent rotative motion by pawl 48, so that with each operation of the pawl, the ratchet wheel 47 is rotated a single notch upon its periphery, thereby rotating the toothed wheel 46 one recess of its periphery.

As will be noted from Fig. 6, the protuberance or interlocking projection 24 is slightly undercut so as to have a depression substantially throughout its base portion. Such a circumferential depression 49 yields, when the projections and corresponding recesses are interlocked, a ball and socket joint so that the unit will not have a tendency to be easily separated by a displacement of the interlocking projection from its corresponding recess.

In Fig. 8, I have illustrated a modification of the punches 27. In the practice of the prior art, these punches, which are effective to remove the portion of the stock strip to bring such strip to the width substantially that of the completed fastener unit, have been made substantially of square section. As the hole in the corresponding die member must be made to fit the punch, such a square hole must be made with accuracy. Furthermore, a square hole is weak at the corners and has a tendency to crack at the corners of the metal material forming the hole. I have found that by making the punch round, an ordinary drill and reamer could be used in the die, thereby eliminating the tendency of the material adjacent the edges of the hole to crack. In accordance with my invention, the cutting edges are imparted within the circumference of the punches and therefore no accurate fitting or broaching, except on the cutting edges, is necessary.

While I have described a specific embodiment of my invention, it is obvious that various changes therein, particularly in the arrangement and configuration of the several parts thereof, may be made without departing from my invention.

I claim:

1. In an apparatus for producing separable fastener elements of the hookless type, the combination of means for intermittently advancing a metal stock strip, means for producing a projection at the top of the fastener unit to be produced from the strip, and simultaneously producing a recess on the bottom thereof, means for blanking out a complete fastener unit with the legs thereof in divergent condition, means for severing a completed unit from the stock strip, and means for compressing the legs of the unit about the corded edge of a fastener tape.

2. In an apparatus for producing separable fastener elements of the hookless type, in which a metal stock strip is intermittently advanced, the combination of means for producing a projection at the top of the fastener unit to be produced from the strip, and simultaneously producing a recess on the bottom thereof, means for punching material from the side edges of the stock strip, leaving the leading portion of that much of the strip which is to constitute a unit, of a width substantially equal to the width of the unit with its legs in divergent condition, means for removing the portion of the stock intermediate the legs of the unit and simultaneously severing a completed unit from the stock strip, and means for compressing the legs of the unit about the corded edge of a fastener tape.

3. In an apparatus for producing separable fastener elements of the hookless type, means for producing a projection at the top of the fastener unit to be produced from an intermittently advanced strip and simultaneously producing a recess on the bottom thereof, means for blanking out a complete fastener unit, and means for severing a completed unit from the stock strip, and means for lifting the leading end of the unit upon severance from the stock strip to clear the surface of the severing element.

4. In an apparatus for producing separable fastener elements of the hookless type, in which a metal stock strip is intermittently advanced, the combination of means for producing a projection at the top of the fastener unit to be produced from the strip, and simultaneously producing a recess on the bottom thereof, means for punching material from the side edges of the stock strip, leaving the leading portion of that much of the strip which is to constitute a unit, of a width substantially equal to the width of the unit with its legs in divergent condition, means for removing the portion of the stock intermediate the legs of the unit and simultaneously severing a completed unit from the stock strip, means for lifting the heel of the unit upon severance from the stock strip to clear the surface of the severing element, and means for compressing the legs of the unit about the corded edge of a fastener tape.

5. An apparatus as claimed in claim 3, in which the means for lifting the leading end of the unit is constituted of a spring-pressed plunger.

6. An apparatus as claimed in claim 3, in which the means for lifting the leading end of the unit is constituted of a spring-pressed plunger having a slanting surface, the upper edge of which is adapted to engage and lift the outer edges of the legs of the unit.

7. In an apparatus for producing separable fastener elements of the hookless type, means for producing a projection at the top of the fastener unit to be produced from an intermittently advanced strip and simultaneously producing a recess on the bottom thereof, means for blanking out a complete fastener unit, and means for severing a completed unit from the stock strip, the means for blanking out the unit including a pair of punches of substantially round configuration, in which the cutting edges are confined within the circumference of the punches.

8. In an apparatus as claimed in claim 2, a pair of punches of substantially round configuration.

9. In an apparatus as claimed in claim 2, a pair of punches of substantially round configuration, in which the cutting edges are confined within the circumference of the punches.

MILTON L. GOTTLIEB.